United States Patent
Jiang et al.

(10) Patent No.: US 12,021,346 B2
(45) Date of Patent: Jun. 25, 2024

(54) MULTI-MODULE FIBER LASER CAPABLE OF MONITORING ABNORMALITIES OF OPTICAL MODULES IN REAL TIME

(71) Applicant: WUHAN RAYCUS FIBER LASER TECHNOLOGIES CO., LTD., Hubei (CN)

(72) Inventors: Wei Jiang, Hubei (CN); Dapeng Yan, Hubei (CN); Yong Ruan, Hubei (CN); Jianhong Shi, Hubei (CN); Lidong Jiang, Hubei (CN)

(73) Assignee: WUHAN RAYCUS FIBER LASER TECHNOLOGIES CO., LTD., Hebei (CN)

( * ) Notice: Subject to any disclaimer, the term of this patent is extended or adjusted under 35 U.S.C. 154(b) by 664 days.

(21) Appl. No.: 17/138,879

(22) Filed: Dec. 30, 2020

(65) Prior Publication Data

US 2021/0119406 A1 Apr. 22, 2021

Related U.S. Application Data

(63) Continuation of application No. PCT/CN2020/114382, filed on Sep. 10, 2020.

(30) Foreign Application Priority Data

Oct. 15, 2019 (CN) .......................... 201910978004.X

(51) Int. Cl.
*H01S 3/131* (2006.01)
*G01M 11/00* (2006.01)
(Continued)

(52) U.S. Cl.
CPC .......... *H01S 3/1312* (2013.01); *G01M 11/30* (2013.01); *G05B 19/042* (2013.01);
(Continued)

(58) Field of Classification Search
CPC ...... H01S 3/1312; H01S 3/067; H01S 3/0912; H01S 3/2383; G01M 11/30; G05B 19/042;
(Continued)

(56) References Cited

U.S. PATENT DOCUMENTS 8,772,692 B2 * 7/2014 Takaoka ........... H04B 10/07955
385/88
9,201,501 B2 * 12/2015 Maizels ............... H04N 13/383
(Continued)

FOREIGN PATENT DOCUMENTS

CN 101094108 12/2007
CN 102381210 3/2012
(Continued)

*Primary Examiner* — Vu A Vu
(74) *Attorney, Agent, or Firm* — MORRISS O'BRYANT COMPAGNI CANNON, PLLC

(57) ABSTRACT

A multi-module fiber laser capable of monitoring abnormalities of optical modules in real time. In the multi-module fiber laser, the CAN bus is employed to directly obtain whether each of the slave control modules or the master control module is in normal working condition, so that the CAN bus is at the status level corresponding to whether all modules are in normal working state, namely, the CAN bus that is configured to transmit the light control signal issued by the master control module. The status level of the slave control module or the combiner module is also transmitted via the (Continued)

CAN bus, so that all the slave control modules can quickly put themselves in the corresponding working state according to the status level of the CAN bus.

5 Claims, 2 Drawing Sheets

(51) Int. Cl.
G05B 19/042 (2006.01)
G05B 23/02 (2006.01)
H01S 3/067 (2006.01)
H01S 3/091 (2006.01)

(52) U.S. Cl.
CPC ......... *G05B 23/0221* (2013.01); *H01S 3/067* (2013.01); *H01S 3/0912* (2013.01); *G05B 2219/2231* (2013.01); *G05B 2219/25032* (2013.01)

(58) Field of Classification Search
CPC ........ G05B 23/0221; G05B 2219/2231; G05B 2219/25032; G05B 2219/24065
USPC ............................................................ 372/6
See application file for complete search history.

(56) References Cited

U.S. PATENT DOCUMENTS

| | | | | |
|---|---|---|---|---|
| 9,552,315 | B2 * | 1/2017 | Monreal | G06F 13/4068 |
| 9,606,948 | B2 * | 3/2017 | Monroe | G06F 13/364 |
| 10,162,041 | B2 * | 12/2018 | Taketomi | G01B 21/04 |
| 10,452,504 | B2 * | 10/2019 | Elend | G06F 13/4072 |
| 10,826,719 | B2 * | 11/2020 | Muth | H04L 12/413 |
| 10,840,665 | B2 * | 11/2020 | Honda | H01S 3/0014 |
| 2012/0083902 | A1 * | 4/2012 | Daum | H04B 3/548 |
| | | | | 700/3 |
| 2016/0182179 | A1 | 6/2016 | Poehlmann et al. | |

FOREIGN PATENT DOCUMENTS

| | | |
|---|---|---|
| CN | 102610999 | 7/2012 |
| CN | 102854871 | 1/2013 |
| CN | 202977954 | 6/2013 |
| CN | 205608449 | 9/2016 |
| CN | 106063055 | 10/2016 |
| CN | 106292385 | 1/2017 |
| CN | 110718847 | 1/2021 |
| JP | 2010118766 A | 5/2010 |
| JP | 2018534787 A | 11/2018 |

* cited by examiner

MULTI-MODULE FIBER LASER CAPABLE OF MONITORING ABNORMALITIES OF OPTICAL MODULES IN REAL TIME

CROSS-REFERENCE TO RELATED APPLICATIONS

This application is a continuation of PCT International Patent Application No. PCT/CN2020/114382 filed Sep. 10, 2020 which claims priority to Chinese Application No. 201910978004X filed on Oct. 15, 2019, titled "Multi-Module Fiber Laser Capable of Monitoring Abnormalities of Optical Modules in Real Time," each of which is hereby incorporated by reference in its entirety.

FIELD OF TECHNOLOGY

The present application relates to the technical field of fiber lasers, and more particularly, to a multi-module fiber laser capable of monitoring abnormalities of optical modules in real time.

BACKGROUND

Fiber lasers have been widely used in industrial, military, medical, and communications applications in recent years due to their small sizes, light weights, and high efficiencies. FIG. 2 is a schematic diagram of a traditional multi-module fiber laser. As shown in FIG. 2, the multi-module fiber laser generally includes several independent optical modules and a combiner, and generally has the advantage of high output power. Each optical module contains several pumping sources with rated output power to output specific optical power. When the master control module system issues emission on control signal, the pumping source in each optical module is injected with current to stimulate electron transition so as to emit laser light. The combiner outputs the total optical power after integrating the independent optical power of each individual optical module.

Therefore, the stable optical power output of each optical module in the multi-module fiber laser is the key to its reliable operation, and it is important for the multi-module fiber laser to provide timely and effective feedback on abnormal optical modules. In actual applications, due to the difference in the operating conditions of each individual optical module, there may be an excessive power of a certain optical module, causing the optical fiber of the optical module to be burn out, or even the combiner to be blown. When the combiner is blown, the optical power is further transmitted to other optical modules in the opposite direction from the fiber input to the combiner, resulting in damage to the other optical modules. The process above will inevitably cause severe damage to the multi-module fiber laser which will lead to abnormal functioning of the laser.

FIG. 3 is a schematic diagram of the connection between a master control module and slave control modules in a traditional multi-module fiber laser. As shown in FIG. 3, the master control module and multiple slave control modules are connected by two data lines a and b, wherein the data line a is configured to transmit the emission on control signal MOD issued by the master control module to each slave control module, and data line b is configured to transmit 0-10V voltage signals of the master control module to control the output power of the pumping sources connected to the slave control modules; wherein 1V means controlling 10% of the full power output of the pumping sources connected to the slave control module at this time, 5V means controlling 50% of the full power output of the pumping sources connected to the slave control module at this time, and 10V means controlling the full power output of the pumping sources connected to the slave control module at this time. In order to ensure the normal operation of the multi-module laser, the master control module needs to query the working status of each slave control module and combiner in real time. When there is a fault in a slave control module or a combiner, the master control module immediately pulls down the emission on control signal if the emission on control signal is active at high level, thus causing the laser connected to the slave control module to stop emitting light. However, there is a delay for the master control module to obtain the feedback signal by this means. If any slave control module fails, the master control module cannot shut down the emission on control signal in time, which will very likely cause damage to the combiner, resulting in damage of the multi-module fiber laser.

In summary, the current multi-module fiber laser fails to monitor the abnormality of each optical module in real time, and thus cannot control emission off in time, causing damage to the combiner, thereby making the multi-module fiber laser unable to function normally.

SUMMARY

In order to at least solve the problem that the current multi-module fiber laser fails to monitor the abnormality of each optical module in real time, and thus fails to control the emission off in time, causing damage to the combiner, thereby making the multi-module fiber laser unable to function normally, an embodiment of the present application provides a multi-module fiber laser capable of monitoring abnormalities of optical modules in real time, the multi-module fiber laser including: a master control module, and a combiner and multiple slave control modules respectively connected to the master control module via a CAN (Controller Area Network) bus, wherein the master control module, the combiner and each of the slave control modules include a CAN physical chip respectively; wherein each CAN physical chip is configured to transmit status signals of the master control module, the slave control modules or the combiner corresponding to each CAN physical chip to a CAN bus; and the CAN bus is configured to control whether all the slave control modules receive emission on control signals issued by the master control module or not according to the status signals.

In an embodiment, the CAN bus includes a first differential line CANH and a first differential line CANL arranged in parallel, and the CAN physical chip includes a first differential line CANH end, a first differential line CANL end, a receiving end and a transmitting end; the first differential line CANH is connected to the first differential line CANH end, and the first differential line CANL is connected to the first differential line CANL end; and the combiner and each of the slave control modules further include a sub-module controller respectively, wherein each of the transmitting ends of the CAN physical chips of the combiner and the slave control modules is connected to an ERR status end of the corresponding sub-module controller; the CAN physical chips of the combiner and the slave control modules control the first differential line CANH end and the first differential line CANL end to transmit the status signals of the combiner and the slave control modules to the first differential line CANH and the first differential line CANL according to signals of the ERR status ends received by the transmitting ends.

In an embodiment, the multi-module fiber laser further includes analog electronic switches connected with the transmitting ends of the CAN physical chips of the slave control modules, wherein the slave control module controls the analog electronic switch to output a set voltage for emission on current control according to the emission on control signal, and a emission on current is outputted after the set voltage for emission on current control passes through a V/I constant current driver to generate the needed current to drive the pumping sources to emit needed laser lights.

In an embodiment, the status signal includes a normal signal and an abnormal signal; correspondingly, the CAN bus is configured to control whether all the slave control modules receive emission on control signals issued by the master control module or not according to the status signals, which specifically includes: the CAN bus prevents the slave control module from receiving the emission on control signal issued by the master control module when any of the status signals is the abnormal signal; and the CAN bus allows the slave control module to receive the emission on control signal issued by the master control module when all the status signals are the normal signals.

In an embodiment, the normal signal is a recessive level, the abnormal signal is a dominant level, and the CAN bus performs wired-AND logic based on the recessive level or the dominant level of each body connected to the CAN bus.

The embodiments of the present application provide a multi-module fiber laser capable of monitoring abnormalities of optical modules in real time, in which multiple slave control modules and a combiner for combining the outputs of the slave control modules are respectively connected to the master control module via a CAN bus, and the master control module, the slave control module and the combiner transmit their status signals to the CAN bus using their integrated CAN physical chips, so that the CAN bus can obtain the working status of the master control module, the slave control module and the combiner according to all their status signals, and control the slave control modules to receive or not receive control signals from the master control module based on the status signals.

Unlike the traditional laser in which a master control module is used to determine whether each slave control module or combiner is operating properly, and then the master control module is controlled to determine whether emission on control signals should be transmitted to each slave control module, in the multi-module fiber laser, the CAN bus for communication is applied for the emission on control signals of the laser in an ingenious manner, and is employed to directly obtain whether each of the slave control modules, the combiner, or the master control module is in normal working condition, so that the CAN bus is at the status level corresponding to whether all modules are in normal working state, namely, the CAN bus that is configured to transmit the light control signal issued by the master control module; moreover, the status level of the master control module, the slave control module or the combiner module is also transmitted via the CAN bus, so that all the slave control modules can quickly put themselves in the corresponding working state according to the status level of the CAN bus, instead of waiting for the master control module to obtain the working status of all slave control modules and later transmit control signals to each slave control module to control the slave control module. The multi-module fiber laser capable of monitoring abnormalities of optical modules in real time provided by the embodiments of the present application is simple in configuration, fast in response, and has good real-time property, and it differs from traditional single-wire transmission laser in that it uses the physical level differential of the CAN bus to transmit optical signals from the master control module to the slave control modules, which is highly resistant to common-mode interference and light leakage, and is highly secure.

BRIEF DESCRIPTION OF THE DRAWINGS

In order to make the technical solutions in the embodiments of the present application or the prior art clearer, drawings needed in the embodiments or the description of the prior art are briefly explained as follows. Obviously, the drawings in the following description are only some of the embodiments of the present application. For those of ordinary skill in the art, other drawings can be obtained based on these drawings without paying any creative effort.

DETAILED DESCRIPTION

In order to specify the objectives, technical solutions and advantages of the embodiments of the present application, the technical solutions in the embodiments of the present application will be described clearly and completely in conjunction with the accompanying drawings in the embodiments of the present application. Obviously, the embodiments described below are part of the embodiments of the present application, rather than all of the embodiments. Based on the embodiments in the present application, all other embodiments obtained by those of ordinary skill in the art without creative effort shall fall within the protection scope of the present application.

Figure 1:
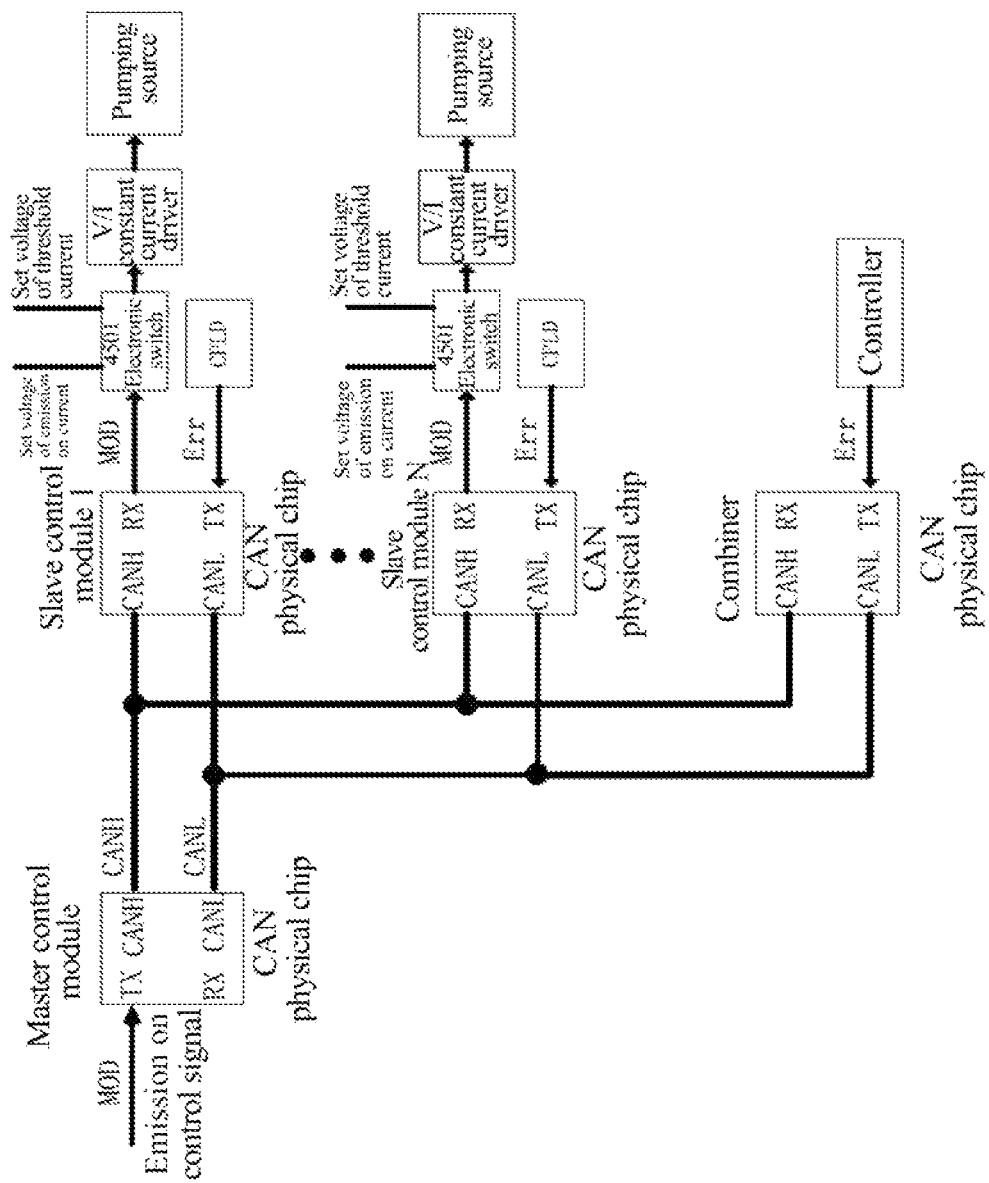
FIG. 1 is a schematic diagram of a multi-module fiber laser capable of monitoring abnormalities of optical modules in real time according to an embodiment of the present application.
Figure 2:
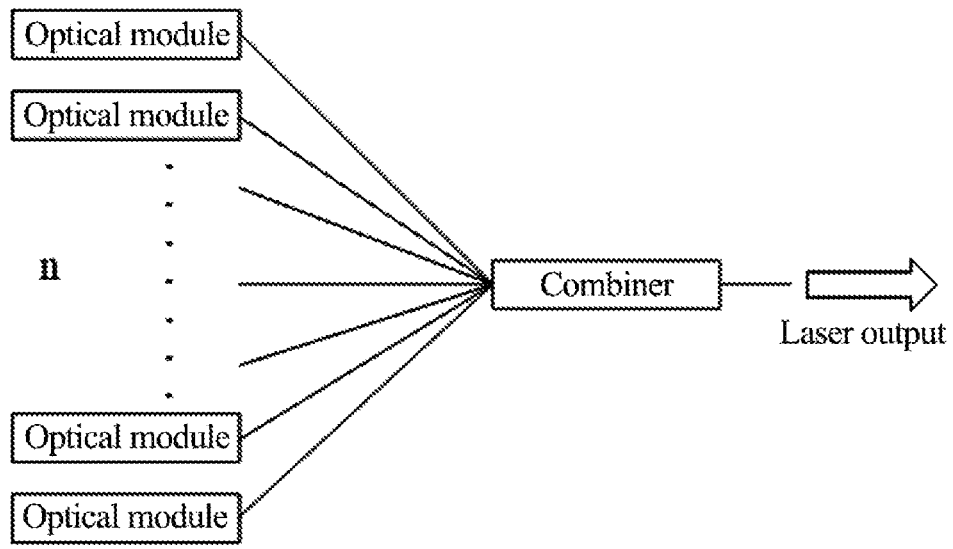
FIG. 2 is a schematic diagram of a traditional multi-module fiber laser.
Figure 3:
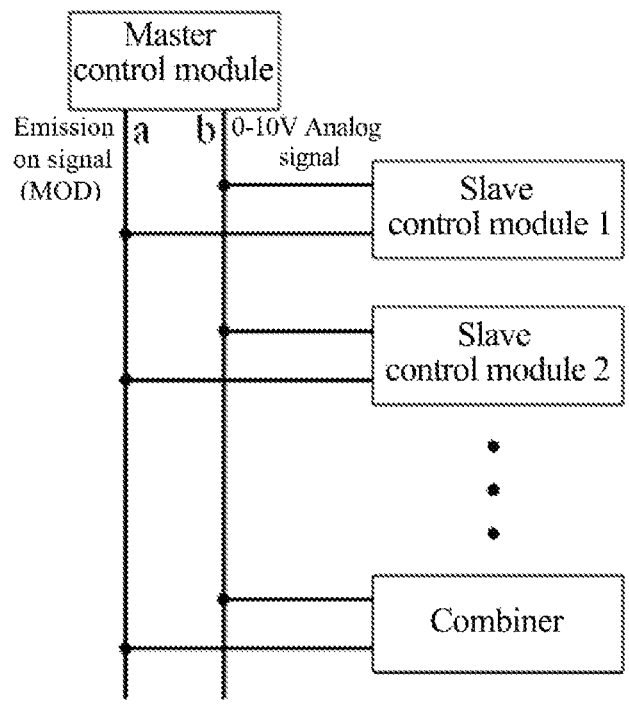
FIG. 3 is a schematic diagram of the connection between a master control module and slave control modules in a traditional multi-module fiber laser.

FIG. 1 is a schematic diagram of a multi-module fiber laser capable of monitoring abnormalities of optical modules in real time according to an embodiment of the present application. As shown in FIG. 1, an embodiment of the present application provides a multi-module fiber laser capable of monitoring abnormalities of optical modules in real time, the multi-module fiber laser including: a master control module, and a combiner and multiple slave control modules respectively connected to the master control module via a CAN bus, wherein the master control module, the combiner and each of the slave control modules include a CAN physical chip respectively; wherein each CAN physical chip is configured to transmit status signals of the master control module, the slave control modules or the combiner corresponding to each CAN physical chip to a CAN bus; and the CAN bus is configured to control whether all the slave control modules receive emission on control signals issued by the master control module or not according to the status signals.

Specifically, multiple slave control modules and a combiner for integrating the slave control modules are respectively connected to the master control module via a CAN bus, and the master control module, the slave control module and the combiner transmit their status signals to the CAN bus using the CAN physical chips included therein, namely, the CAN physical chip of the master control module issues emission on control signals to the CAN physical chip of the slave control modules and the combiner via the CAN bus and the CAN physical chips of the master control module, the slave control modules and the combiner transmit their respective status signals to the CAN bus, so that the CAN bus can obtain the working status of the master control module, the slave control module and the combiner according to all the status signals, and control whether the slave control modules receive the emission on control signals from the master control module or not based on the status signals.

Unlike the traditional laser in which a master control module is used to determine whether each slave control module or combiner is operating properly, and then the master control module is controlled to send or not send emission on control signals to each slave control module, in the multi-module fiber laser capable of monitoring abnormalities of optical modules in real time, the CAN bus for communication is applied for emission on control signals of the laser in an ingenious manner, and is employed to directly obtain whether each of the slave control modules, the combiner, or the master control module is in normal working condition, so that the CAN bus is at the status level corresponding to whether all modules are in normal working state, and each slave control module can quickly put itself in the corresponding working state according to the status level of the CAN bus, instead of waiting for the master control module to obtain the working status of all slave control modules and later transmit control signals to each slave control module to control the slave control module. The laser is simple in configuration, fast in response, and has good real-time property, and it differs from traditional single-wire transmission laser in that it uses the physical level differential of the CAN bus to transmit emission on control signals from the master control module to the slave control modules, which is highly resistant to common-mode interference and light leakage, and is highly secure.

On the basis of the foregoing embodiment, as shown in FIG. 1, the sub-module controller is CPLD. The CAN bus includes a first differential line CANH and a first differential line CANL arranged in parallel, and the CAN physical chip includes a first differential line CANH end, a first differential line CANL end, a receiving end and a transmitting end; the first differential line CANH is connected to the first differential line CANH end, and the first differential line CANL is connected to the first differential line CANL end; and the combiner and each of the slave control modules further include a sub-module controller respectively, wherein each of the transmitting ends of the CAN physical chips of the combiner and the slave control modules is connected to an ERR status end of the corresponding sub-module controller; the CAN physical chips of the combiner and the slave control modules control the first differential line CANH end and the first differential line CANL end to transmit the status signals of the combiner and the slave control modules to the first differential line CANH and the first differential line CANL according to signals of the ERR status ends received by the transmitting ends.

Specifically, the CAN physical chip of each slave control module and the combiner sends the status signal of the master control module, slave control module or combiner corresponding to the CAN physical chip to the first differential line CANH and the first differential line CANL via the first differential line CANH end and the first differential line CANL end, so that the CAN bus can obtain the operating states of the slave control modules and the combiner through the high-low relationship of levels between the first differential line CANH and the first differential line CANL.

As for both the combiner and the slave control module, the sub-module controller may monitor the status and safety of the combiner and the slave control module. When the combiner or any one of the slave control modules is abnormal, the ERR status end of the sub-module controller causes the transmitting end of the CAN physical chip of the slave control module to transmit a status signal, and the CAN physical chips of the combiner and the slave control module to transmit the status signal to the first differential line CANH and the first differential line CANL through the first differential line CANH end and the first differential line CANL end, so that the CAN bus can obtain the operating states of the combiner and each slave control module through the high-low relationship of levels between the first differential line CANH and the first differential line CAN L.

On the basis of the foregoing embodiments, the multi-module fiber laser further includes analog electronic switches connected with the transmitting ends of the CAN physical chips of the slave control modules, wherein the slave control module controls the analog electronic switch to output a set voltage for emission on current according to the emission on control signal, and a emission on current is outputted after the set voltage for emission on current passes through a V/I constant current driver to drive the pumping source to emit laser lights.

Specifically, the slave control module controls the analog electronic switch to output the emission on current according to the emission on control signal MOD issued by the master control module to the receiving end of the CAN physical chip of the slave control module, so that the pumping source connected to the analog electronic switch emits laser lights.

On the basis of the foregoing embodiments, the status signal includes a normal signal and an abnormal signal; correspondingly, the CAN bus is configured to control whether all the slave control modules receive emission on control signals issued by the master control module or not according to the status signals, which specifically includes: the CAN bus prevents the slave control module from receiving the emission on control signal issued by the master control module when any of the status signals is the abnormal signal; and the CAN bus allows the slave control module to receive the emission on control signal issued by the master control module when all the status signals are the normal signals.

Specifically, when the master control module, the slave control modules and the combiner are all in a normal state, the status signals they transmit to the CAN bus are all normal signals, so that the CAN bus is at a working level corresponding to all modules in the normal working state, and then the slave control module receives the emission on control signal issued by the master control module according to the working level of the CAN bus; when any one of the master control module, slave control modules and the combiner is in an abnormal state, this module transmits an abnormal signal to the CAN bus, so that the CAN bus is at a working level corresponding to not all modules in the normal working state, that is, at a working level corresponding to any module in the abnormal state, and then the slave control module does not receive the emission on control signal issued by the master control module according to the working level of the CAN bus.

It should be noted that when the multi-module fiber laser is powered on, the status signal issued by the master control module to the CAN bus is also an abnormal signal when the pumping source connected to the slave control module does not need to emit laser lights, and at this time the master control module does not send the emission on control signal to the slave control module, and accordingly the laser does not emit laser lights.

On the basis of the foregoing embodiments, the normal signal can be set to a recessive level, the abnormal signal can be set to a dominant level, and the CAN bus performs wired-AND logic based on the recessive level or the dominant level.

The wired-AND logic in the embodiment of the present application means that if the CAN bus is connected to two CAN communication nodes, one CAN communication node outputs a recessive level and the other outputs a dominant level at the same time. The wired-AND logic will make the CAN bus itself at a dominant level, and it can be considered that the dominant has priority. Therefore, when all levels received by the CAN bus are recessive levels, the CAN bus is at a recessive level as well; if the CAN bus receives one dominant level, the CAN bus is at a dominant level.

A specific embodiment of the multi-module fiber laser capable of monitoring abnormalities of optical modules in real time is provided below to explain the application logic of the multi-module fiber laser in detail, wherein the analog electronic switch is a 4051 analog electronic switch, the receiving end of the CAN physical chip is the RX end, and the transmitting end of the CAN physical chip is the TX end; moreover, the normal signal, i.e., the recessive level is set to high level, and the abnormal signal, i.e., the dominant level is set to low level.

As shown in FIG. 1, the CAN bus is used for emission on control between the master control module and the slave control modules.

The emission on control signal MOD issued by the master control module is connected to the TX end of its CAN physical chip, the RX end of the CAN physical chip of the slave control module is connected to the selection end of the 4051 analog electronic switch, and the TX end of the CAN physical chip of the slave control module is connected to the ERR status end of the sub-module controller.

When the laser is powered on, all devices on the CAN bus are in a normal state, the TX end of the CAN physical chip is set to high level in each slave control module, and the TX end of the master control module (emission on control signal MOD) is at low level; thus the CAN bus is in a dominant voltage state, and the laser does not emit laser lights.

When the laser needs to emit laser lights, the TX end of the master control module (emission on control signal MOD) is at a high level, the CAN bus is at a recessive level, and the RX end of the CAN physical chip of each slave control module outputs a high level. The 4051 analog electronic switch switches to the emission on current to allow the laser to emit laser lights. Assuming that one of the slave control modules (or the combiner module) detects a module abnormality at this time, the slave control module immediately sets the TX end (ERR status end) signal of the CAN physical chip to low level, making the CAN bus at a dominant level, and the output of the RX end of the CAN physical chip of all slave control modules (including the combiner) on the CAN bus is low level. Thus the 4051 analog electronic switch switches to the threshold current to turn off the emission, thereby avoiding damage to the combiner and other slave control modules.

It should be noted that the embodiments are only for illustrating the technical solutions of the present application, rather than limiting them; although the present application has been described in detail with reference to the foregoing embodiments, those skilled in the art should understand that the technical solutions documented in the preceding embodiments may still be modified, or parts of the technical features thereof can be equivalently substituted; and such modifications or substitutions do not deviate from scope of the technical solutions of the embodiments of the present application.

The invention claimed is:

1. A multi-module fiber laser capable of monitoring abnormalities of optical modules in real time, comprising: a master control module, and a combiner and multiple slave control modules respectively connected to the master control module via a controller area network (CAN) bus, wherein the master control module, the combiner and each of the slave control modules include a CAN physical chip respectively;
    wherein each CAN physical chip is configured to transmit status signals of the master control module, the slave control modules or the combiner corresponding to each CAN physical chip to a CAN bus; and
    the CAN bus is configured to control whether all the slave control modules receive emission on control signals issued by the master control module or not according to the status signals.

2. The multi-module fiber laser capable of monitoring abnormalities of optical modules in real time of claim 1, wherein the CAN bus includes a first differential line CAN H (CANH) and a first differential line CAN L (CANL) arranged in parallel, and the CAN physical chip includes a first differential line CANH end, a first differential line CANL end, a receiving end and a transmitting end; the first differential line CANH is connected to the first differential line CANH end, and the first differential line CANL is connected to the first differential line CANL end; and
    the combiner and each of the slave control modules further include a sub-module controller respectively, wherein each of the transmitting ends of the CAN physical chips of the combiner and the slave control modules is connected to an error (ERR) status end of the corresponding sub-module controller; the CAN physical chips of the combiner and the slave control modules control the first differential line CANH end and the first differential line CANL end to transmit the status signals of the combiner and the slave control modules to the first differential line CANH and the first differential line CANL according to signals of the ERR status ends received by the transmitting ends.

3. The multi-module fiber laser capable of monitoring abnormalities of optical modules in real time of claim 1, further comprising analog electronic switches connected with the transmitting ends of the CAN physical chips of the slave control modules, wherein the slave control module controls the analog electronic switch to output a set voltage for emission on current according to the emission on control signal, and a emission on current is outputted after the set voltage for emission on current passes through a V/I constant current driver to drive the pumping source to emit laser lights.

4. The multi-module fiber laser capable of monitoring abnormalities of optical modules in real time of claim 2, wherein the status signal includes a normal signal and an abnormal signal;
    the CAN bus is configured correspondingly to control whether all the slave control modules receive emission on control signals issued by the master control module or not according to the status signals, comprising:

the CAN bus prevents the slave control module from receiving the emission on control signal issued by the master control module when any of the status signals is the abnormal signal; and the CAN bus allows the slave control module to receive the emission on control signal issued by the master control module when all the status signals are the normal signals.

5. The multi-module fiber laser capable of monitoring abnormalities of optical modules in real time of claim 4, wherein the normal signal is a recessive level, the abnormal signal is a dominant level, and the CAN bus performs wired-AND logic based on the recessive level or the dominant level.

\* \* \* \* \*